US011250595B2

United States Patent
Covell et al.

(10) Patent No.: US 11,250,595 B2
(45) Date of Patent: Feb. 15, 2022

(54) TILED IMAGE COMPRESSION USING NEURAL NETWORKS

(71) Applicant: GOOGLE LLC, Mountain View, CA (US)

(72) Inventors: Michele Covell, Woodside, CA (US); Damien Vincent, Zurich (CH); David Charles Minnen, Mountain View, CA (US); Saurabh Singh, Mountain View, CA (US); Sung Jin Hwang, Mountain View, CA (US); Nicholas Johnston, San Jose, CA (US); Joel Eric Shor, Mountain View, CA (US); George Dan Toderici, Mountain View, CA (US)

(73) Assignee: Google LLC, Mountain View, CA (US)

( * ) Notice: Subject to any disclaimer, the term of this patent is extended or adjusted under 35 U.S.C. 154(b) by 135 days.

(21) Appl. No.: 16/617,484

(22) PCT Filed: May 29, 2018

(86) PCT No.: PCT/US2018/034933
§ 371 (c)(1),
(2) Date: Nov. 26, 2019

(87) PCT Pub. No.: WO2018/218249
PCT Pub. Date: Nov. 29, 2018

(65) Prior Publication Data
US 2020/0111238 A1     Apr. 9, 2020

Related U.S. Application Data

(60) Provisional application No. 62/511,935, filed on May 26, 2017.

(51) Int. Cl.
*G06T 9/00* (2006.01)
*G06N 3/04* (2006.01)
(Continued)

(52) U.S. Cl.
CPC ........... *G06T 9/002* (2013.01); *G06N 3/0454* (2013.01); *G06N 3/08* (2013.01); *G06T 3/4046* (2013.01); *G06T 7/0002* (2013.01)

(58) Field of Classification Search
CPC ..... G06T 9/002; G06T 3/4046; G06T 7/0002; G06N 3/0454; G06N 3/08; G06N 3/0445; H04N 19/593; H04N 19/176
See application file for complete search history.

(56) References Cited

U.S. PATENT DOCUMENTS

| | | | | |
|---|---|---|---|---|
| 10,332,001 B2* | 6/2019 | Rippel | ................ | H04N 19/126 |
| 10,402,722 B2* | 9/2019 | Rippel | ................ | H04N 19/126 |
| 2018/0107925 A1* | 4/2018 | Choi | ...................... | G06N 3/084 |

FOREIGN PATENT DOCUMENTS

| | | | |
|---|---|---|---|
| CN | 108960333 A | * | 12/2018 |
| JP | 2007/503784 | | 2/2007 |

(Continued)

OTHER PUBLICATIONS

JP Office Action in Japanese Application No. 2019-559287, dated Dec. 21, 2020, 11 pages.

(Continued)

*Primary Examiner* — Charles T Shedrick
(74) *Attorney, Agent, or Firm* — Fish & Richardson P.C.

(57) ABSTRACT

Methods, systems, and apparatus, including computer programs encoded on computer storage media, for image compression and reconstruction. An image encoder system receives a request to generate an encoded representation of an input image that has been partitioned into a plurality of tiles and generates the encoded representation of the input image. To generate the encoded representation, the system processes a context for each tile using a spatial context prediction neural network that has been trained to process context for an input tile and generate an output tile that is a prediction of the input tile. The system determines a residual (Continued)

image between the particular tile and the output tile generated by the spatial context prediction neural network by process the context for the particular tile and generates a set of binary codes for the particular tile by encoding the residual image using an encoder neural network.

20 Claims, 6 Drawing Sheets

(51) Int. Cl.
*G06N 3/08* (2006.01)
*G06T 3/40* (2006.01)
*G06T 7/00* (2017.01)

(56) References Cited

FOREIGN PATENT DOCUMENTS

| JP | 2011/188129 | 9/2011 | | |
|---|---|---|---|---|
| WO | WO 2009/025347 | 2/2009 | | |
| WO | WO 2016/199330 | 12/2016 | | |
| WO | WO-2018213499 A1 * | 11/2018 | ............ | H04N 19/00 |
| WO | WO-2018218249 A1 * | 11/2018 | ........... | G06N 3/0445 |

OTHER PUBLICATIONS

Minnen et al., "Spatially Adaptive Image Compression Using a Tiled Deep Network" ICIP, 2017, 5 pages.
Sento et al., "Image Compression with Auto-encoder Algorithm using Deep Neural Network" 2016 Management and Innovation Technology International Conference, 5 pages.
Abadi et al., "TensorFlow: Large Scale Machine Learning on Hetergenous Distributed Systems", arXiv:1603.04467v2, Mar. 2016, 19 pages.
Balle et al., "End-to-end optimization of nonlinear transform codes for perceptual quality", arXiv:1607.05006v2, Oct. 2016, 5 pages.
Bellard., "BPG Image Format", accessed Jan. 30, 2017, [retrieved Mar. 2, 2020], retrieved from URL<http://bellard.org/-bpg/>.
Covell et al., "Target-Quality Image Compression with Recurrent, Convolutional Neural Networks", arXiv:1705.06687v1, May 2017, 5 pages.
GoogleDevelopers.com [online], "Compression Techniques", accessed Jan. 31, 2017, [retrieved Mar. 2, 2020], retrieved from URL<https://developers.google.com/speed/webp/docs/compression>.
Gregor et al., "Towards Conceptual Compression", Advances in Neural Information Processing Systems, 2016, 9 pages.
International Preliminary Report on Patentability in International Application No. PCT/US2018/034933, dated Nov. 26, 2019, 8 pages.
International Search Report and Written Opinion in International Application No. PCT/US2018/034933, dated Oct. 29, 2018, 14 pages.
ISO IEC 15444-1:2000E, "Information technology—JPEG 2000 image coding system—Part 1: Core coding system" International Standard, Dec. 2000, 240 pages.
Jiang, "Image compression with neural networks—A survey", Image Communication, 1999, 14:737-760.
Kingma et al., "Adam: A Method for Stochastic Optimization", arXiv: 1412.6980v9, Jan. 2017, 15 pages.
Long et al., "Fully Convolutional Networks for Semantic Segmentation", Proceedings of the IEEE Conference on Computer Vision and Pattern Recognition, 2015, pp. 3431-3440.
Mohsenian et al., "Predictive Vector Quantization Using a Neural Network Approach", Optical Engineering, Jul. 1993, 32(7):1503-1513.
Pathak et al., "Context Encoders: Feature Learning by Inpainting", Proceedings of the IEEE Conference on Computer Vision and Pattern Recognition, 2016, pp. 2536-2544.
Pennebaker et al., "JPEG Still Image Data Compression Standard", Springer Science & Business Media, 1992, 44 pages.
Raiko et al., "Techniques for Learning Binary Stochastic Feedforward Neural Networks", arXiv: 1406.2989v3, Apr. 2015, 10 pages.
Rizvi et al., "Finite-State Residual Vector Quantization Using Tree-Structured Competetive Neural Network", IEEE Transactions on Circuits and Systems for Video Technology, Apr. 1997, 7(2):1-4.
Toderici et al., "Full Resolution Image Compression with Recurrent Neural Networks", Proceedings of the IEEE Conference on Computer Vision and Pattern Recognition, 2017, pp. 5306-5314.
Toderici et al., "Variable Rate Image Compression with Recurrent Neural Networks", arXiv:1511.06085v5, Mar. 2016, 12 pages.
Ueno et al., "Adaptive Predictive Coding of Still Images Using Neural Networks", Electronics and Communications in Japan, Part 1—Communications, Mar. 1993, 76(3):31-41.
KR Office Action in Korean Application 10-20197032378, dated Jan. 19, 2021, 20 pages (with English translation).
EP Office Action in European Application No. 18749605.4, dated Mar. 17, 2021, 7 pages.
IN Office Action in Indian Application No. 201927041282, dated Jun. 1, 2021, 6 pages.
KR Office Action in Korean Application No. 10-2019-7032378, dated Jul. 21, 2021, 9 pages (with English translation).

* cited by examiner

FIG. 2a

- Context (Top Left) 206a
- Context (Top) 204a
- Context (Left) 208
- Target Tile 202a

FIG. 2b

- Context (Top) 204b
- Target Tile 202b

FIG. 2c

- Target Tile 202c

FIG. 2d

- Context (Left) 206d
- Target Tile 202d

500

```
┌─────────────────────────────────────────────┐
│ Receive a request to generate an encoded    │
│ representation of an input image            │
│                                         502 │
└─────────────────────────────────────────────┘
                     │
                     ▼
┌─────────────────────────────────────────────┐
│ Generate the encoded representation of the  │
│ input image                                 │
│                                         504 │
└─────────────────────────────────────────────┘
```

```
┌─────────────────────────────────────────────┐
│ Process an encoder input for an iteration   │
│ using a spatial context neural network      │
│                                         506 │
└─────────────────────────────────────────────┘
                     │
                     ▼
┌─────────────────────────────────────────────┐
│ Determine a residual image between the      │
│ particular input tile and the output of the │
│ spatial context neural network          507 │
└─────────────────────────────────────────────┘
                     │
                     ▼
┌─────────────────────────────────────────────┐
│ Generate a set of binary codes for the      │
│ particular tile by encoding the residual    │
│ image using an encoder neural network   508 │
└─────────────────────────────────────────────┘
```

FIG. 5b

TILED IMAGE COMPRESSION USING NEURAL NETWORKS

BACKGROUND

This specification relates to compressing and reconstructing images using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence form the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes technologies for image compression and reconstruction using a tiled deep network. These technologies generally involve dividing an input image into tiles, using spatial context to make an initial prediction of the pixel values within each tile, and progressively encoding the residual.

In general, one innovative aspect of the subject matter described in this specification can be embodied in methods that include the actions of image compression and reconstruction. Other embodiments of this aspect include corresponding computer systems, apparatus, and computer programs, which may be recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination.

An image encoder system may receive a request to generate an encoded representation of an input image that has been partitioned into tiles. The image encoder system then generates the encoded representation of the input image. The encoded representation includes a respective set of binary codes for each of the tiles. Generating the encoded representation for a particular tile may include: processing a context for the particular tile using a spatial context prediction neural network that has been trained to process context for an input tile to generate an output tile that is a prediction of the input tile. The context may include one or more tiles neighboring the particular tile in the input image. A residual image may be determined between the particular tile and the output tile generated by the spatial context prediction neural network by processing the context for the particular tile and the set of binary codes for the particular tile may be generated by encoding the residual image using an encoder neural network.

The input image may be compressed by compressing the binary codes in the encoded representation using a data compression algorithm. The data compression algorithm may be a trained entropy coder. The compressed input image may be transmitted to an image decoder system for decompression of the input image.

The encoder neural network may be a recurrent neural network configured to encode the residual by, at each time step, receiving an encoder input for the time step; and processing the encoder input to generate a set of binary codes for the time step. The encoder input for a first time step may be the residual image. The encoder input for a time step after the first time step may be a temporary residual image between (i) the residual and (ii) a reconstruction generated by a decoder neural network from the set of binary codes at the previous time step, the decoder neural network is a recurrent neural network that is configured to, at each time step, receive a decoder input comprising the set of binary codes for the time step and to process the decoder input to generate a reconstruction of the encoder input at the time step.

Generating the set of binary codes for the particular tile includes, at each time step, determining from the reconstruction of the encoder input for the time step whether a quality threshold for the particular tile when reconstructed from the binary codes already generated at the time step and any previous time steps has been satisfied.

Generating the set of binary codes for the particular tile may include in response to determining that the quality threshold has been satisfied, using the already generated binary codes as the set of binary codes for the particular tile in the encoded representation of the input image.

Generating the set of binary codes for the particular tile may include, at each time step, determining whether a quality threshold for the particular tile has been satisfied when the particular tile is reconstructed from the set of binary codes generated at the current time step and in response to determining the quality threshold is satisfied, using the set of binary codes generated at the current time step for the particular tile as the set of binary codes for the particular tile in the encoded representation of the input image.

When the particular tile is not on a left or top border of the input image, the context may be the neighboring tiles to the left and above the particular tile in the input image.

When the particular tile is on the left border of the input image and is not in a top border of the input image, the context may be the neighboring tiles above the particular tile and placeholder context data.

When the particular tile is in the top left corner of the input image, the context may be placeholder context data.

When the particular tile is on a top border of the input image and is not in the top left corner of the input image, the context may be the neighboring tile to the left of the particular tile and placeholder context data.

Another embodiment may include receiving a request to reconstruct an input image from an encoded representation of the input image, the input image may be partitioned into tiles and the encoded representation may include a respective set of binary codes for each of the tiles. A reconstruction of the input image may be generated for a particular tile by processing a context for the particular tile using a spatial context prediction neural network that has been trained to process context for an input tile to generate an output tile that is an initial reconstruction image of the input tile. The context may include reconstructions of one or more tiles neighboring the particular tile in the input image. A residual reconstruction image of the particular tile may be generated by processing the set of binary codes for the tile using a decoder neural network and the initial reconstruction image may be combined with the residual reconstruction image of the particular tile to generate a final reconstruction of the particular tile.

Generating the reconstruction may include receiving a compressed input image and decompressing the compressed input image using a data decompression algorithm to generate the respective sets of binary codes for the tiles.

The data decompression algorithm may be a trained entropy decoder.

The set of binary codes for the particular tile may include a respective subset of binary codes for each time step. The decoder neural network may be a recurrent neural network configured to generate the residual by, at each time step, processing the subset of binary codes for the time step to generate a time step reconstruction residual image.

Generating the reconstruction residual image may include combining the time step reconstruction residual images for the time steps.

The subject matter described in this specification can be implemented in particular embodiments so as to realize one or more of the following advantages. An image compression and reconstruction system as described in this document combines the advantages of deep convolutional neural networks with bit rate adaptation using a tiled convolutional neural network. The system uses the residual between spatial context prediction data for image tiles and the true image tiles to encode and decode the image. This process results in less data needing to be transmitted from the encoder to the decoder while still producing high quality outputs. In particular, a given tile may be represented using fewer bits or a less complex string of bits that can be compressed to a smaller size due to the use of the spatial context predictor neural network and because the compressed bits only need to represent the residual rather than the entire tile.

In conventional image compression techniques, local information sharing creates dependencies on nearby binary codes, making it difficult to adjust the bit rate across an image. Existing image compression algorithms based on neural networks learn quantized representations with a constant spatial bit rate across each image In contrast, by using the block-based architecture of a tiled convolutional neural network as described, the image compression system achieves resolution flexibility and local information sharing while also significantly simplifying the implementation of bit rate adaptation based on local reconstruction quality.

Additionally, adaptive bit allocation is difficult in existing neural network compression architectures because models are fully-convolutional. If such networks are trained with all of the binary codes present, reconstruction with missing codes can be arbitrarily bad.

The system avoids arbitrarily bad reconstructions by sharing information from the binary codes within each tile. This strategy allows for the bit rate to be reduced in one area of tiles without degrading the quality of neighboring tiles. The system accurately reconstructs image details and predicts pixel values across object boundaries using a spatial context prediction neural network, a residual encoding neural network, and a residual decoding neural network. The system takes advantage of correlations between relatively distant pixels and thus avoids the cost of re-encoding visual information that is consistent from one tile to the next.

Another advantage is that the tiled, adaptive approach makes it easier to encode an image with constant quality (e.g., similar PSNR across the entire image), which improves subjective evaluations.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2a shows an example context patch.

FIG. 2b shows an example context patch.

FIG. 2c shows an example context patch.

FIG. 2d shows an example context patch.

FIG. 5a illustrates an example process for compressing and reconstructing images using a spatially-adaptive approach.

FIG. 5b illustrates an example process for compressing and reconstructing images using a spatially-adaptive approach.

Like reference numbers and designations in the various drawings indicate like elements.

DETAILED DESCRIPTION

This specification generally describes image compression and reconstructions systems and methods that use a spatially-adaptive approach, with tiled convolutional neural networks, to compress and reconstruct images.

Image compression is a type of data compression applied to digital images to reduce the cost of storing or transmitting digital images. This image compression may be lossless or lossy. Lossless compression allows original data to be completely reconstructed from the compressed data whereas lossy compression provides reconstruction of an approximation of the original data.

An example image compression and reconstruction system uses a block-based, spatially adaptive approach with tiled convolutional neural networks for lossy image compression.

Figure 1:
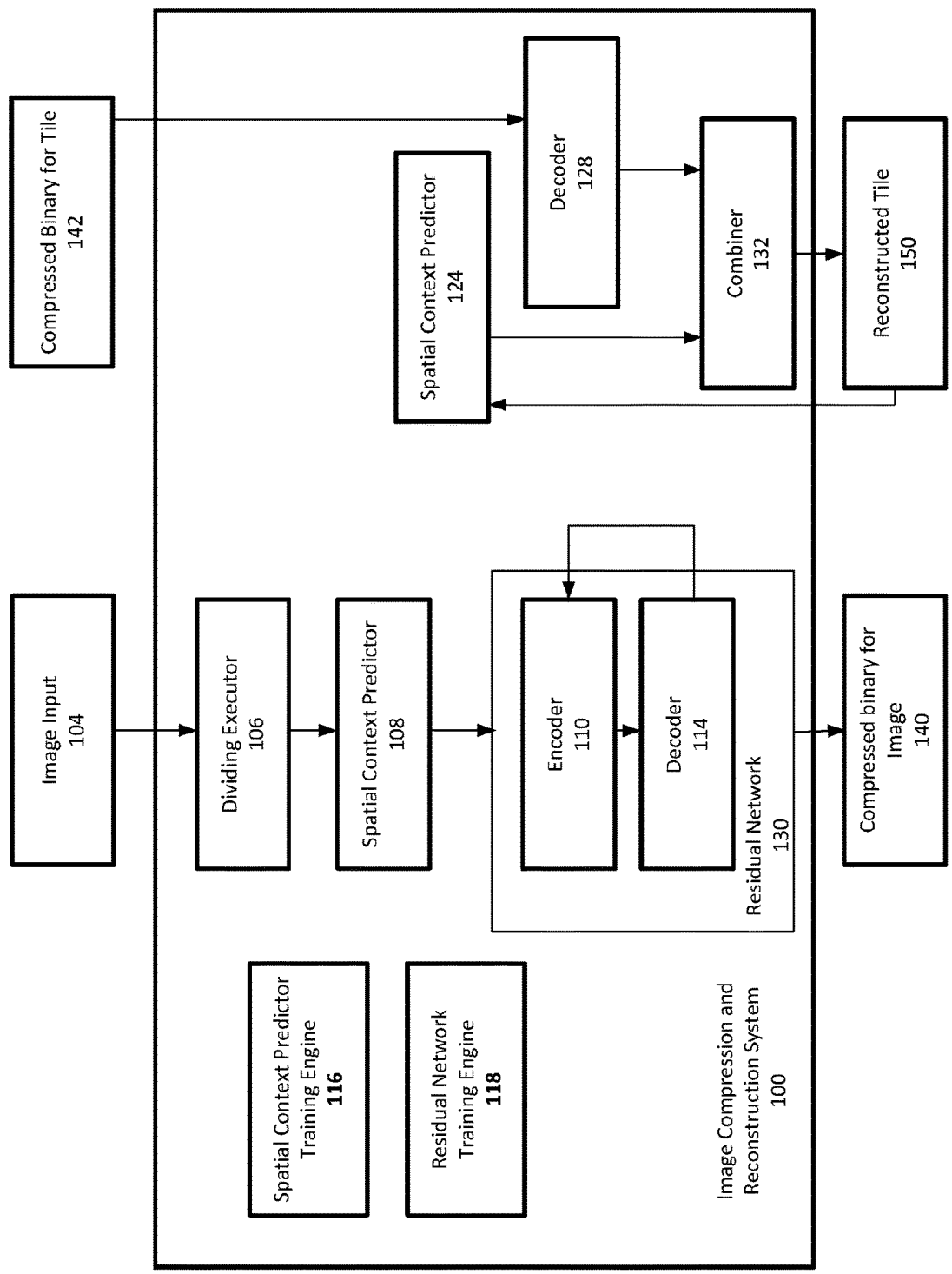
FIG. 1 shows an example image compression and reconstruction system that uses a spatially-adaptive approach, with tiled convolutional neural networks, to compress and reconstruct images

FIG. 1 illustrates an example image compression and reconstruction system 100. The image compression and reconstruction system 100 is an example of a system implemented as computer programs on one or more computers in one or more locations, in which the systems, components, and techniques described below can be implemented. The system 100 compresses an input image 104 and determines image reconstructions of the input images with quality-sensitive bit rate spatial adaptation using a tiled neural network. This spatial adaptation allows the system to use additional bits more effectively by preferentially describing regions of an input image that are more complex or visually salient. While FIG. 1 shows both the encoding and decoding components of the system as part of the same system, in some implementations, the components can be separate systems and located on separate computing devices. For example, in one example implementation, the encoding components, i.e., those components necessary to compress the input image, can be located on a server and the decoding components, i.e., those components necessary to re-construct the input image, can be located on a client device.

During operation, the image compression and reconstruction system 100 takes in an input image 104 to be compressed and a dividing executor 106 divides the image into tiles. For example, an input image 104 may be divided into tiles, each formed of 32×32 pixels or divided into tiles of any other suitable number of pixels.

The system 100 then encodes the image 104 tile-by-tile.

For each tile, a spatial context provider 108 uses neighboring tiles as spatial context to create a 'context patch.'

FIGS. 2a-d illustrate example 64×64 context patches 200a-d in which the values of a target tile 202 have not yet been processed. When a particular tile 202a is not on a left or top border of the input image, as illustrated in FIG. 2a, the spatial context is created using the neighboring tiles to the left and above the particular tile in the input image 204a, 206a, 208. When the particular tile 202b is on the left border of the input image and is not in the top left corner of the input image, as illustrated in FIG. 2b, the spatial context is created using the neighboring tile 204a above the particular tile 202b. FIG. 2c illustrates that when the particular tile 202c is in the top left corner of the input image, the spatial context for the particular tile 202c is created with placeholder context data. FIG. 2d illustrates that when the particular tile 202d is on the top border of the input image and is not in the top left corner of the input image, the spatial context is created using the neighboring image to the left of the particular tile 205d and placeholder context data.

Referring back to FIG. 1, a spatial context predictor 108 is a neural network that is trained to process context for an input tile to generate an output tile that is a prediction of the input tile. For example, the spatial context predictor 108 can receive an image context patch for the input tile, e.g., a 64×64 pixel context patch as illustrated in FIGS. 2a-d, and generate a prediction of the input tile. The spatial context predictor will be discussed in more detail below with respect to FIG. 3.

The system 100 then uses a residual network 130 to fill in reconstruction image details. The residual network 130 is a deep network based on recurrent auto-encoders. The residual network 130 includes an encoder 110 and a decoder 114. Example recurrent architectures for the encoder 110 and the decoder 114 neural networks are described in G. Toderici, D. Vincent, N. Johnston, S. J. Hwang, D. Minnen, J. Shor, and M. Covell, "Full resolution image compression with recurrent neural networks," CoRR, vol. abs/1608.05148, 2016, the entire contents of which are hereby incorporated by reference, particularly with respect to the recurrent architectures for the encoder and decoder neural networks.

For each tile, the encoder 110 encodes the residual between the true image tile and the initial prediction. In some implementations, the encoder executes the encoding iteratively. At each iteration, the encoder 110 receives an encoder input for the iteration and encodes the encoder input to generate a set of binary codes for each tile of the input image that represent the encoded version of the tile. At the first iteration, the encoder input is the residual between the true image tile and the initial prediction. The encoder 110 encodes the residuals to create binary codes and uses a decoder 114 to reconstruct the input from the binary to capture residual remaining from the previous iteration. The decoded pixel values are stored 122 and used as context for predicting subsequent tiles. At each iteration after the first iteration, the encoder input is a residual tile from the preceding iteration. By reconstructing the tile and capturing the residual remaining from the previous iteration, the system provides successively better approximations of the original input.

The residual network 130 iteratively continues the encoding process until all tiles of the image input 104 have been processed. The image compression and reconstruction system 100 then provides the compressed binary for the image 140.

In some implementations, once a tile is encoded, the residual network may send the encoded residuals 142, i.e., binary codes or compressed binary codes, to a decoder 128 for decoding. Image decoding proceeds tile-by-tile in raster order. The image compression and reconstruction system 100 runs a spatial context predictor 124 for the decoder on the context for the tile to obtain a predicted tile. The context can be obtained using already reconstructed tiles 150. The decoder 128 iteratively decodes the binary codes to obtain the residuals between the actual decoded tile and the predicted tile from the spatial context predictor 124. A combiner 132 then combines the decoded residual and the predicted tile to obtain the full reconstruction of the tile 150. The spatial context predictor 124 can be advantageous by avoiding the possible emergence of boundary artifacts between tiles by sharing information across tile boundaries without increasing the bit rate. In essence, the context prediction neural network can generate pixels that mesh well with their context and, since the predicted pixels of the tiles are more detailed and accurate near the context pixels, the network can act to minimize border artifacts. The decoder 128 is a neural network. Example recurrent architectures for the decoder neural networks are described in G. Toderici, D. Vincent, N. Johnston, S. J. Hwang, D. Minnen, J. Shor, and M. Covell, "Full resolution image compression with recurrent neural networks," CoRR, vol. abs/1608.05148, 2016, the entire contents of which are hereby incorporated by reference, in particular in regard to recurrent architectures for decoder neural networks.

The image compression and reconstruction system 100 also includes a training engine 116 for the spatial context predictor 108 and a training engine 118 for the residual encoding network 130. Both the spatial context predictor 108 and the residual encoding network 130 are trained sequentially. The spatial context predictor 108 is trained to process context for an input tile to generate an output tile that is a prediction of the input tile. The residual encoder network is trained to compress the residual within each tile after running the spatial context predictor. The encoder network learns to encode the specific pixel errors that remain after spatial context prediction. Each training process may use a mini-batch size of 32 images and an initial learning rate of 0.5 following an exponential decay schedule (B=0.95) with a step size of 20,000. In some implementations, the two networks may be trained together. In other implementations, the two networks may be trained separately.

Training data may be context image patches, e.g., 64×64 image patches as illustrated in FIGS. 2a-d. These image patches may be cropped from a collection of images. The training procedure may be similar to the one described in G. Toderici, D. Vincent, N. Johnston, S. J. Hwang, D. Minnen, J. Shor, and M. Covell, "Full resolution image compression with recurrent neural networks," CoRR, vol. abs/1608.05148, 2016, the entire contents of which are hereby incorporated by reference, in particular in regard to the training procedure.

While FIG. 1 shows encoding and decoding components as well as the spatial context predictor as part of the same system, in some implementations, the components can be separate systems and located on separate computing devices. For example, in an embodiment, the encoder 110 can be located on a server and the decoder 114 can be located on a client device. The spatial context predictor 108 may be on a third computing device.

Figure 3:
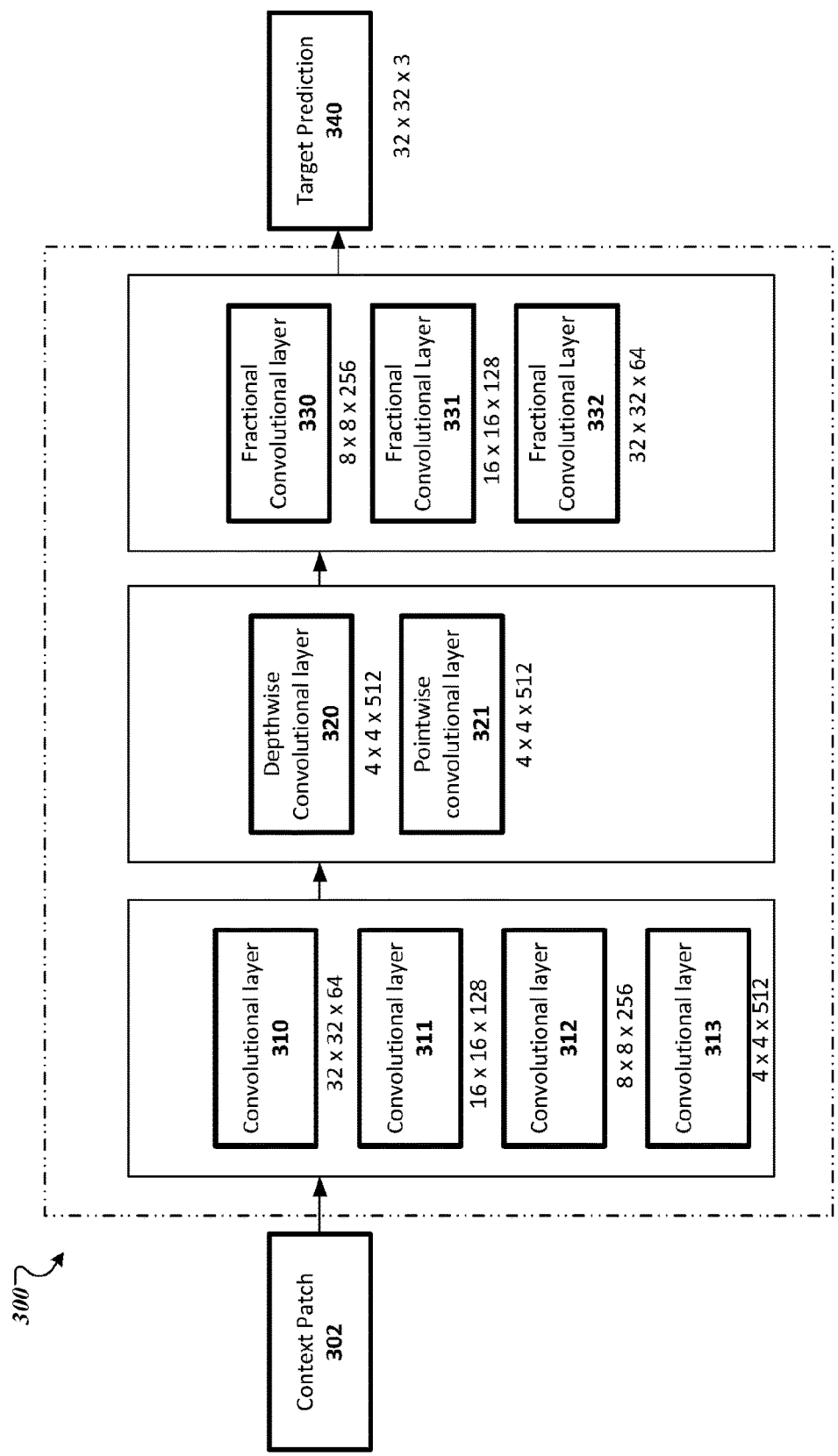
FIG. 3 shows an example spatial context prediction neural network.

FIG. 3 shows an example architecture 300 of a spatial context predictor network. The spatial context predictor network uses strided convolution to extract features from the context tiles and uses fractional convolution to generate an RGB prediction for a target tile.

The spatial context predictor takes in a (3-channel) context patch 302 as input. The predictor processes the input using four convolutional layers 310, 311, 312, 313. Each of these layers learns a feature map with a reduced resolution and a higher depth. The predictor then uses a depth-wise convolutional layer 320 followed by a pointwise convolutional layer 321 to implement a channel-wise, fully-connected layer as described by Deepak Pathak, Philipp Krahenbuhl, Jeff Donahue, Trevor Darrell, and Alexei Efros, in "Context encoders: Feature learning by Inpainting," in CVPR, 2016, the entire contents of which are hereby incorporated by reference, in particular in regard to a channel-wise, fully-connected layer. This layer allows information to propagate across an entire tile without incurring the full quadratic cost of a fully-connected layer.

In the last stage of the network, the predictor uses fractional convolutional layers 330, 331, 332 to incrementally increase the spatial resolution until the last layer generates a 3-channel image from the preceding 32×32×64 feature map to produce a target prediction 340.

The system then determines a residual image between the actual tile and the target prediction 340 generated by the spatial context prediction neural network. A residual network processes the residual image tile to compress the residual within each tile.

Figure 4:
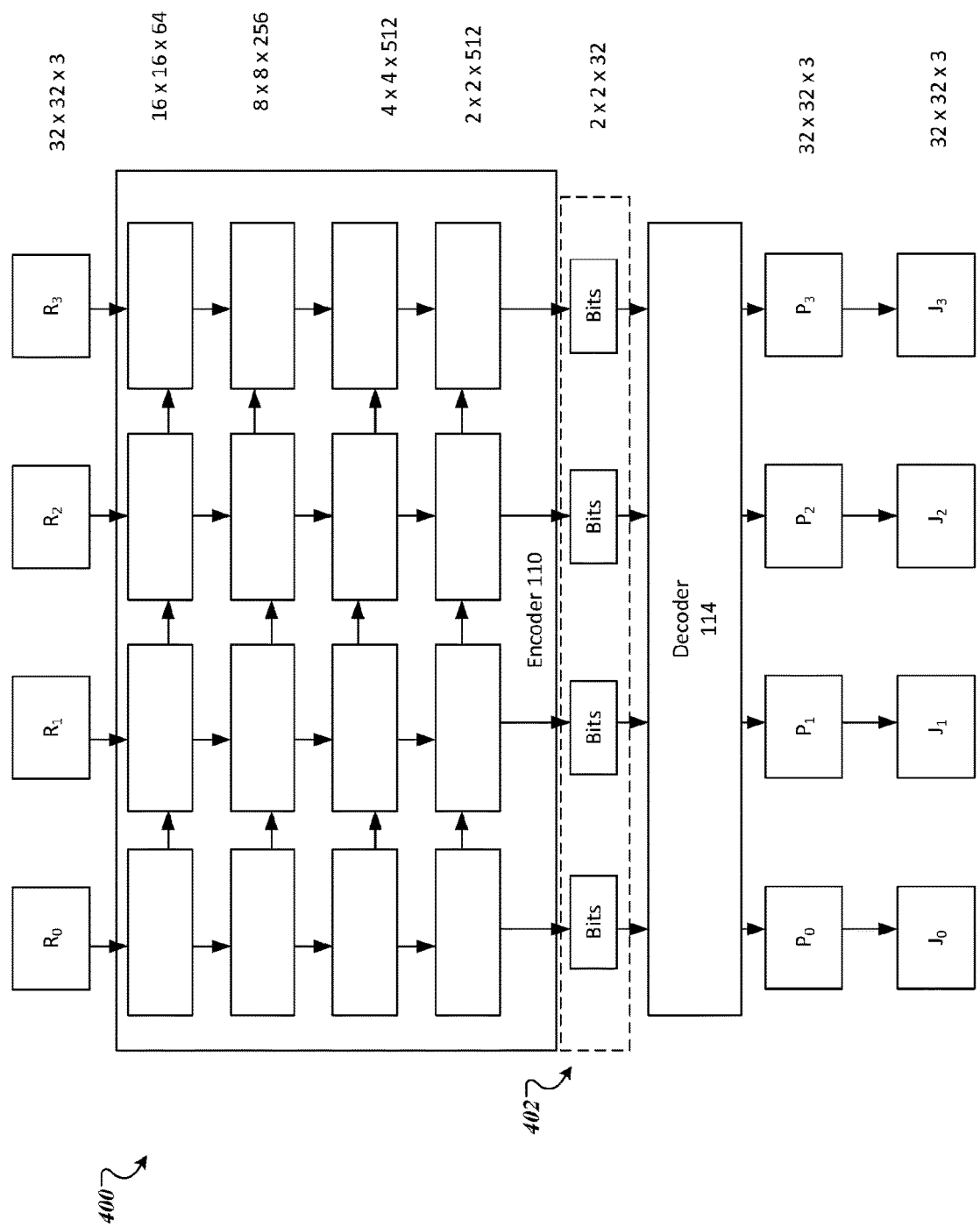
FIG. 4 shows an example residual encoder neural network.

FIG. 4 shows an example residual network 400 that compresses and reconstructs residual images. The residual network 400 uses a recurrent auto-encoder architecture in which each layer has a defined height, width, and depth. The spatial context predictor can generate accurate, low frequency, data for each new tile. In the case where the spatial context predictor is not able to recover many image details, reconstruction quality can be improved by compression and reconstruction of the residual images with a recurrent auto-encoder architecture. In each iteration, the residual encoder, extracts features from the input and quantizes them to generate 128 bits. FIG. 4 shows four iterations.

At each time step, the residual encoder network receives an encoder input for the time step and processes the input using an encoder 110 to generate a set of binary codes for the time step. For the first time step, the encoder input is the residual image between the target prediction of the spatial context prediction neural network and the actual tile of an input image.

The system compresses the input image by compressing the binary codes in the encoded representation using a data compression algorithm, e.g., a trained entropy coder. The system may transmit the compressed input image to an image decoder for decompression of the input image.

A decoder 114 learns to reconstruct the input from these binary codes.

Reconstruction may comprise decompressing the compressed binary codes to generate the respective sets of binary codes for the tiles. Each iteration tries to capture the residual remaining from the previous iteration ($P_i$) so the sum across iteration outputs provides a successively better approximation of the original input.

The encoder input for time steps after the first time step are temporary residual images between (i) the residual and (ii) a reconstruction generated by the decoder neural network from the set of binary codes at the previous time step.

The encoder portion of the network uses one convolutional layer to extract features from the input residual image followed by three convolutional LSTM layers that reduce the spatial resolution and generate feature maps. Weights are shared across all iterations and the recurrent connections allow information to propagate from one iteration to the next.

The binary bottleneck layer 402 maps incoming features to (−1, 1) using a 1×1 convolution followed by a tanh activation function. The system samples from the output of the tanh ($P(b=1)=0.5-(1+\tanh(x))$) to encourage exploration in parameter space. More details of an example sampling is described by Raiko, M. Berglund, G. Alain, and L. Dinh, in "Techniques for learning binary stochastic feedforward neural networks," ICLR, 2015, the content of which in regard to sampling is hereby incorporated by reference. When the system applies the trained network to real images, the system binarizes deterministically ($b=\text{sign}(\tanh(x))$) with $b=1$ when $x=0$).

Although not illustrated in FIG. 4, the decoder 114 has the same structure as the encoder 110. However, the decoder 114 uses fractional convolution to increase the resolution of each feature map. The final layer takes the output of the decoder, which is a feature map with a shape of 32×32×64, and uses a tanh activation to map the features to three values in the range [−1, 1]. The output is then scaled, clipped, and quantized to 8-bit RGB values ($R=\text{round}(\min(\max(R^1*142+128.0), 255)))$) The system scales by 142 instead of 128 to allow the network to more easily predict extreme pixel values without entering the range of tanh with tiny gradients, which can lead to very slow learning.

The system generates the set of binary codes for a particular tile at each time step by determining whether a quality threshold for the particular tile has been satisfied when the particular tile is reconstructed from the binary codes already generated at the current time step or any previous time steps. The quality threshold can be predetermined threshold, for example representative of a target quality for the reconstructed image. If the quality threshold has been satisfied, the system uses the already generated binary codes as the set of binary codes for the particular tile in the encoded representation of the input image. This adaptive approach is facilitated by the residual encoder being a recurrent network which can be stopped after any step. Since each step generates additional bits, this mechanism allows for adaptive bit allocation between different tiles, and can thus allow a single neural network to generate encodings at different bit rates.

FIG. 5 is a flowchart of an example process 500 for compressing and reconstructing an image use a spatially-adaptive approach, with tiled convolutional neural networks. For convenience, the process 500 will be described as being performed by a system of one or more computers, located in one or more locations, and programmed appropriately in accordance with this specification. For example, an image compression and reconstruction system, e.g., the image compression and reconstruction system 100 of FIG. 1, appropriately programmed, can perform the process 500.

As illustrated in FIGS. 5a and 5b, the image compression and reconstruction system receives a request to generate an encoded representation of an input image that has been partitioned into tiles 502. The system then generates an encoded representation of the input image that includes a respective set of binary codes for each tile of the input image 504. The system generates the encoded representation by first processing a context for the particular tile using a spatial context prediction neural network 506. As described above, the spatial context prediction neural network is trained to process context for an input tile to generate an output tile that is a prediction of the input tile. The system then determines a residual image between the particular input tile and the output tile generated by the spatial context prediction neural network 507. The system generates a set of binary codes for the particular tile by encoding the residual image using an encoder neural network 508. This encoding process is described above with respect to FIG. 4.

Figure 6:
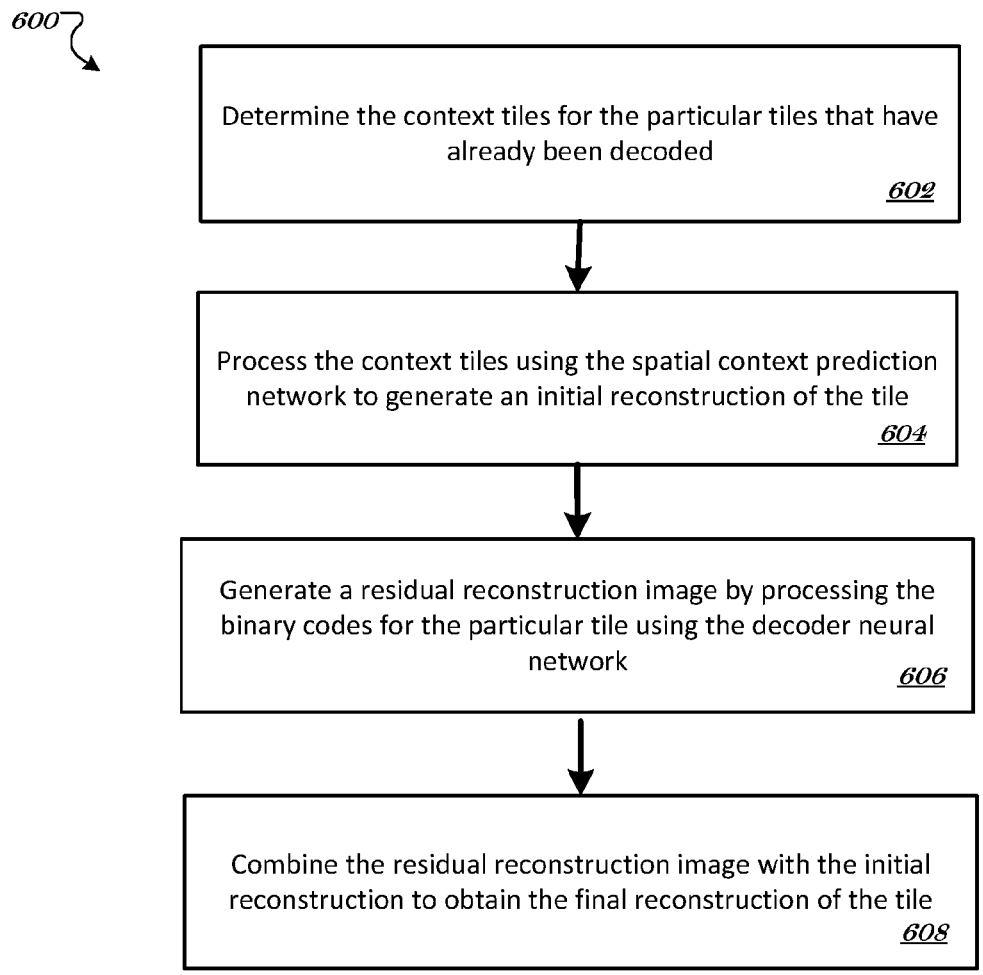
FIG. 6 illustrates an example process for decoding compressed images using a spatially-adaptive approach.

FIG. 6 is a flowchart of an example process 600 for decoding a compressed image use a spatially-adaptive approach. For convenience, the process 600 will be described as being performed by a system of one or more computers, located in one or more locations, and programmed appropriately in accordance with this specification. For example, an image compression and reconstruction system, e.g., the image compression and reconstruction system 100 of FIG. 1, appropriately programmed, can perform the process 600.

As illustrated in FIG. 6, the image compression and reconstruction system determines context tiles for particular tiles that have already been decoded (or reconstructed) 602. The system then processes the context tiles using the spatial context prediction network to generate an initial reconstruction of the target tile 604. The system generates a residual reconstruction image by processing the binary codes for the particular tile using the decoder neural network 606. The system then combines the residual reconstruction image with the initial reconstruction to obtain the final reconstruction tile 608.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user In addition to the embodiments of the attached claims and the embodiments described above, the following numbered embodiments are also innovative:

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Embodiment 1 is a method comprising: receiving, by an image encoder system comprising one or more computers, a request to generate an encoded representation of an input image that has been partitioned into a plurality of tiles; and generating, by the image encoder system, the encoded representation of the input image, wherein the encoded representation includes a respective set of binary codes for each of the plurality of tiles, and wherein the generating comprises, for a particular tile of the plurality of tiles: processing a context for the particular tile using a spatial context prediction neural network that has been trained to process context for an input tile to generate an output tile that is a prediction of the input tile, wherein the context comprises one or more tiles neighboring the particular tile in the input image; determining a residual image between the particular tile and the output tile generated by the spatial context prediction neural network by processing the context for the particular tile; and generating the set of binary codes for the particular tile by encoding the residual image using an encoder neural network.

Embodiment 2 is the method of embodiment 1, further comprising: compressing the input image by compressing the binary codes in the encoded representation using a data compression algorithm.

Embodiment 3 is the method of embodiment 2, wherein the data compression algorithm is a trained entropy coder.

Embodiment 4 is the method of any one of embodiments 2 or 3, further comprising transmitting the compressed input image to an image decoder system for decompression of the input image.

Embodiment 5 is the method of any one of embodiments 1-4, wherein the encoder neural network is a recurrent neural network configured to encode the residual by, at each of a plurality of time steps: receiving an encoder input for the time step; and processing the encoder input to generate a set of binary codes for the time step.

Embodiment 6 is the method of embodiment 5, wherein the encoder input for a first time step of the plurality of time steps is the residual image.

Embodiment 7 is the method of any one of embodiments 5 or 6, wherein the encoder input for a time step of the plurality of time steps after the first time step is a temporary residual image between (i) the residual and (ii) a reconstruction generated by a decoder neural network from the set of binary codes at the previous time step, wherein the decoder neural network is a recurrent neural network that is configured to, at each of the plurality of time steps, receive a decoder input comprising the set of binary codes for the time step and to process the decoder input to generate a reconstruction of the encoder input at the time step.

Embodiment 8 is the method of embodiment 7, wherein generating the set of binary codes for the particular tile comprises, at each of the plurality of time steps: determining from the reconstruction of the encoder input for the time step whether a quality threshold for the particular tile when reconstructed from the binary codes already generated at the time step and any previous time steps has been satisfied.

Embodiment 9 is the method of embodiment 8, wherein generating the set of binary codes for the particular tile comprises: in response to determining that the quality threshold has been satisfied, using the already generated binary codes as the set of binary codes for the particular tile in the encoded representation of the input image.

Embodiment 10 is the method of any one of embodiments 1 to 6, wherein generating the set of binary codes for the particular tile comprises, at each of a plurality of time steps: determining whether a quality threshold for the particular tile has been satisfied when the particular tile is reconstructed from the set of binary codes generated at the current time step; and in response to determining the quality threshold is satisfied, using the set of binary codes generated at the current time step for the particular tile as the set of binary codes for the particular tile in the encoded representation of the input image.

Embodiment 11 is the method of any one of embodiments 1-10, wherein, when the particular tile is not on a left or top border of the input image, the context is the neighboring tiles to the left and above the particular tile in the input image.

Embodiment 12 is the method of embodiment 11, wherein when the particular tile is on the left border of the input image and is not in a top left corner of the input image, the context is the neighboring tile above the particular tile and placeholder context data.

Embodiment 13 is the method of embodiment 12, wherein when the particular tile is in the top left corner of the input image, the context is placeholder context data.

Embodiment 14 is the method of any one of embodiments 11-13, wherein when the particular tile is on a top border of the input image and is not in the top left corner of the input image, the context is the neighboring tile to the left of the particular tile and placeholder context data.

Embodiment 15 is a method comprising: receiving, by an image decoder system comprising one or more computers, a request to reconstruct an input image from an encoded representation of the input image, wherein the input image has been partitioned into a plurality of tiles, and wherein the encoded representation includes a respective set of binary codes for each of the plurality of tiles; and generating, by the image decoder system, a reconstruction of the input image, wherein the generating comprises, for a particular tile of the plurality of tiles: processing a context for the particular tile using a spatial context prediction neural network that has been trained to process context for an input tile to generate an output tile that is an initial reconstruction image of the input tile, wherein the context comprises reconstructions of one or more tiles neighboring the particular tile in the input image; generating a residual reconstruction image of the particular tile by processing the set of binary codes for the tile using a decoder neural network; and combining the initial reconstruction image and the residual reconstruction image of the particular tile to generate a final reconstruction of the particular tile.

Embodiment 16 is the method of embodiment 15, wherein generating the reconstruction further comprises: receiving a compressed input image; and decompressing the compressed input image using a data decompression algorithm to generate the respective sets of binary codes for the tiles.

Embodiment 17 is the method of embodiment 16, wherein the data decompression algorithm is a trained entropy decoder.

Embodiment 18 is the method of any one of embodiments 15-17, wherein the set of binary codes for the particular tile includes a respective subset of binary codes for each of a plurality of time steps, and wherein the decoder neural network is a recurrent neural network configured to generate the residual by, at each of the plurality of time steps: processing the subset of binary codes for the time step to generate a time step reconstruction residual image.

Embodiment 19 is the method of embodiment 18, wherein generating the reconstruction residual image comprises: combining the time step reconstruction residual images for the plurality of time steps.

Embodiment 20 is the method of any one of embodiments 15-19, wherein, when the particular tile is not on a left or top border of the input image, the context is the reconstructions of neighboring tiles to the left and above the particular tile in the input image.

Embodiment 21 is the method of embodiment 20, wherein, when the particular tile is on the left border of the input image and is not in a top left corner of the input image, the context is reconstruction of the neighboring tile above the particular tile and placeholder context data.

Embodiment 22 is the method of embodiment 21, wherein, when the particular tile is in the top left corner of the input image, the context is placeholder context data.

Embodiment 23 is the method of any one of embodiments 20-22, wherein, when the particular tile is on a top border of the input image and is not in the top left corner of the input image, the context is a reconstruction of the neighboring tile to the left of the particular tile and placeholder context data.

Embodiment 24 is a system comprising one or more computers and one or more storage devices storing instructions that when executed by the one or more computers cause the one or more computers to perform the operations of the respective method of any one of embodiments 1-23.

Embodiment 25 is one or more computer storage media storing instructions that when executed by one or more computers cause the one or more computers to perform the operations of the respective method of any one of embodiments 1-23.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
receiving, by an image encoder system comprising one or more computers, a request to generate an encoded representation of an input image that has been partitioned into a plurality of tiles; and
generating, by the image encoder system, the encoded representation of the input image, wherein the encoded representation includes a respective set of binary codes for each of the plurality of tiles, and wherein the generating comprises, for a particular tile of the plurality of tiles:

processing a context for the particular tile using a spatial context prediction neural network that has been trained to process context for an input tile to generate an output tile that is a prediction of the input tile, wherein the context comprises one or more tiles neighboring the particular tile in the input image;

determining a residual image between the particular tile and the output tile generated by the spatial context prediction neural network by processing the context for the particular tile; and generating the set of binary codes for the particular tile by encoding the residual image using an encoder neural network, wherein the encoder neural network is configured to encode the residual image by, at each of a plurality of time steps:
receiving an encoder input for the time step; and
processing the encoder input to generate a set of binary codes for the time step.

2. The method of claim 1, further comprising:
compressing the input image by compressing the binary codes in the encoded representation using a data compression algorithm.

3. The method of claim 2, wherein the data compression algorithm is a trained entropy coder.

4. The method of claim 2, further comprising:
transmitting the compressed input image to an image decoder system for decompression of the input image.

5. The method of claim 1, wherein the encoder neural network is a recurrent neural network.

6. The method of claim 5, wherein the encoder input for a first time step of the plurality of time steps is the residual image.

7. The method of claim 5, wherein the encoder input for a time step of the plurality of time steps after the first time step is a temporary residual image between (i) the residual and (ii) a reconstruction generated by a decoder neural network from the set of binary codes at the previous time step, wherein the decoder neural network is a recurrent neural network that is configured to, at each of the plurality of time steps, receive a decoder input comprising the set of binary codes for the time step and to process the decoder input to generate a reconstruction of the encoder input at the time step.

8. The method of claim 7, wherein generating the set of binary codes for the particular tile comprises, at each of the plurality of time steps:
determining from the reconstruction of the encoder input for the time step whether a quality threshold for the particular tile when reconstructed from the binary codes already generated at the time step and any previous time steps has been satisfied.

9. The method of claim 8, wherein generating the set of binary codes for the particular tile comprises:
in response to determining that the quality threshold has been satisfied, using the already generated binary codes as the set of binary codes for the particular tile in the encoded representation of the input image.

10. The method of claim 1 wherein generating the set of binary codes for the particular tile comprises, at each of a plurality of time steps:
determining whether a quality threshold for the particular tile has been satisfied when the particular tile is reconstructed from the set of binary codes generated at the current time step; and
in response to determining the quality threshold is satisfied, using the set of binary codes generated at the current time step for the particular tile as the set of binary codes for the particular tile in the encoded representation of the input image.

11. The method of claim 1, wherein, when the particular tile is not on a left or top border of the input image, the context is the neighboring tiles to the left and above the particular tile in the input image.

12. The method of claim 11, wherein when the particular tile is on the left border of the input image and is not in a top left corner of the input image, the context is the neighboring tile above the particular tile and placeholder context data.

13. The method of claim 12, wherein when the particular tile is in the top left corner of the input image, the context is placeholder context data.

14. The method of claim 11, wherein when the particular tile is on a top border of the input image and is not in the top left corner of the input image, the context is the neighboring tile to the left of the particular tile and placeholder context data.

15. A method comprising:
receiving, by an image decoder system comprising one or more computers, a request to reconstruct an input image from an encoded representation of the input image, wherein the input image has been partitioned into a plurality of tiles, and wherein the encoded representation includes a respective set of binary codes for each of the plurality of tiles; and
generating, by the image decoder system, a reconstruction of the input image, wherein the generating comprises, for a particular tile of the plurality of tiles:
processing a context for the particular tile using a spatial context prediction neural network that has been trained to process context for an input tile to generate an output tile that is an initial reconstruction image of the input tile, wherein the context comprises reconstructions of one or more tiles neighboring the particular tile in the input image;
generating a residual reconstruction image of the particular tile by processing the set of binary codes for the tile using a decoder neural network, wherein the set of binary codes for the particular tile includes a respective subset of binary codes for each of a plurality of time steps, and wherein the decoder neural network is configured to generate a residual image by, at each of the plurality of time steps, processing the subset of binary codes for the time step to generate a time step reconstruction residual image; and
combining the initial reconstruction image and the residual reconstruction image of the particular tile to generate a final reconstruction of the particular tile.

16. The method of claim 15, wherein generating the reconstruction further comprises:
receiving a compressed input image; and
decompressing the compressed input image using a data decompression algorithm to generate the respective sets of binary codes for the tiles.

17. The method of claim 15, wherein the set of binary codes for the particular tile includes a respective subset of binary codes for each of a plurality of time steps, and wherein the decoder neural network is a recurrent neural network configured to generate the residual by, at each of the plurality of time steps:
processing the subset of binary codes for the time step to generate a time step reconstruction residual image.

18. The method of claim 17, wherein generating the reconstruction residual image comprises:

combining the time step reconstruction residual images for the plurality of time steps.

19. The method of claim 15, wherein, when the particular tile is not on a left or top border of the input image, the context is the reconstructions of neighboring tiles to the left and above the particular tile in the input image.

20. One or more non-transitory computer storage media storing instructions that when executed by one or more computers cause the one or more computers to perform the operations of:

receiving, by an image encoder system comprising one or more computers, a request to generate an encoded representation of an input image that has been partitioned into a plurality of tiles; and generating, by the image encoder system, the encoded representation of the input image, wherein the encoded representation includes a respective set of binary codes for each of the plurality of tiles, and wherein the generating comprises, for a particular tile of the plurality of tiles:

processing a context for the particular tile using a spatial context prediction neural network that has been trained to process context for an input tile to generate an output tile that is a prediction of the input tile, wherein the context comprises one or more tiles neighboring the particular tile in the input image;

determining a residual image between the particular tile and the output tile generated by the spatial context prediction neural network by processing the context for the particular tile; and generating the set of binary codes for the particular tile by encoding the residual image using an encoder neural network, wherein the encoder neural network is configured to encode the residual image by, at each of a plurality of time steps:

receiving an encoder input for the time step; and processing the encoder input to generate a set of binary codes for the time step.

* * * * *